July 24, 1956  L. M. COTCHETT ET AL  2,755,515
TOP ROLL FOR DRAWING FRAMES
Filed April 16, 1951
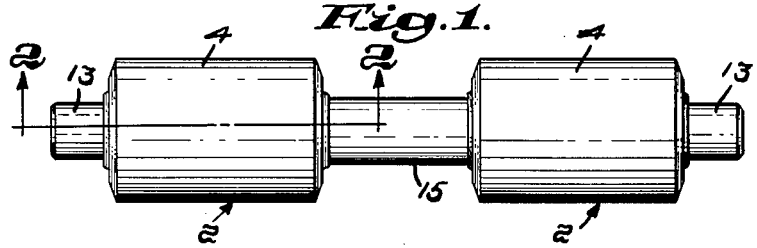
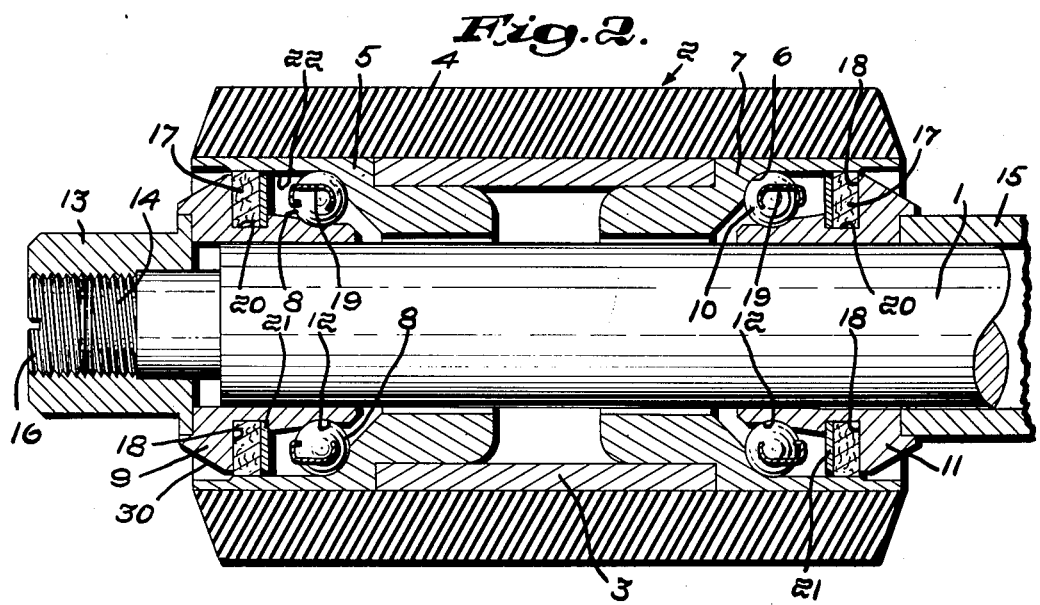
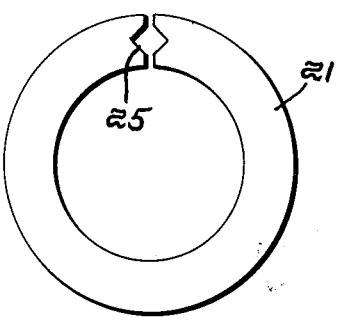
Inventors:
Louis M. Cotchett,
Kenneth P. Swanson,
by Robert K. Randall,
Attorney

United States Patent Office 2,755,515
Patented July 24, 1956

2,755,515
TOP ROLL FOR DRAWING FRAMES

Louis M. Cotchett, Whitman, and Kenneth P. Swanson, Abington, Mass.; said Swanson assignor, by mesne assignments, to said Cotchett Application April 16, 1951, Serial No. 221,270

4 Claims. (Cl. 19—142)

The present invention relates to top rolls for drawing frames and more particularly to shell type top rolls having antifriction bearings, and has as its main object the provision of means preventing access of lint and fly and other foreign matter to the bearings.

An acute problem is presented by the accumulation of lint and fly at the bearings of shell type top rolls especially those provided with ball bearings, as it causes the roll shells to rotate unevenly or to resist rotation resulting in the production of an inferior grade of yarn and breakdown of the ends. To overcome this undesirable condition it has been proposed to provide dust or lint preventing flanges, sleeves, leather gaskets, and other lint barriers on the shaft, or to place packing or other seals on the rotating outer bearing races of the top roll assembly, but such attempts have either failed to prevent the access of lint or fly into the bearing chambers or have resulted in structures that have been objectionable because these prior seals themselves increase the collecting of lint and thus only shift the seat of the trouble. This is well exemplified by the tortuous path type of lint barrier, wherein the first fiber to lodge therein inevitably collects others, and so on at an accelerating rate; the fibers being unable to enter farther pile up and pack until they stop the rotation of the roll shell completely, even though they do keep the fibers out of the bearings. Also, the prior structures have largely been difficult to assemble or costly and time-consuming to produce. Additionally, such seals when positioned on the inside of the roll shells commonly are held in place adjacent to the anti-friction bearings by the cumbersome step of contracting a split washer radially inward of itself in preparation for letting it expand outwardly into a groove cut on the parallel walls of the inside of the cup forming the outer race or the cylindrical passage leading thereto, thus making assembly a difficult and time-consuming operation, and disassembling even harder. Further, these prior constructions have left insufficient room for bearing balls of adequate size. These factors have produced a problem of such complexity that a simple commercially successful method for keeping foreign matter out of such bearings under the most severe conditions of linting, as with long staple cotton, has not heretofore been found, and thus the recognised advantages of antifriction type rolls have not been fully attained in practice.

The primary object of our invention is to devise a compact and comparatively inexpensive anti-friction shell type top roll from the bearings of which lint and fly are excluded.

Another object of our invention is to provide a seal for the bearings of anti-friction shell type top rolls which can be applied to existing constructions with a minimum of change in the parts of the latter, and without impairing the ease and speed of assembly of the rolls, and which can be easily and quickly removed and renewed.

Another object of our invention is to provide a lint seal for a shell type anti-friction roll which is simple and rugged in construction and efficient in operation.

We have discovered that the objects of this invention can be attained by a non-metallic barrier, such as a felt washer or other yieldable material, mounted on the cone which forms the stationary inner race member for an anti-friction bearing, such washer substantially preventing the access of lint and other foreign matter thereinto and additionally absorbing or preventing the escape of any vagrant grease from the bearings onto the work-engaging surfaces of the rolls, while at the same time being adaptable to existing anti-friction roll devices. The felt washer is removably locked in position on the cone comprising the inner race member by either one or two expansible metallic snap-rings or split washers slidably mounted in an external peripheral groove in such member, the provision of such groove being the only change commonly required in this member. Placing the seal on the inner race results in an increase in the ease and speed of assembly because the tapered shape of the supporting cone makes it easy to slip the felt washer and split ring over it, the cone itself expanding the washer and split ring until they settle in the groove. In this novel manner the felt washer and its locking ring can be pressed onto the cone and this assembly then slid onto the shaft of the top roll simply and easily by hand, and may be easily and simply disassembled by expanding the split ring and sliding the parts off from the cone. Thus the ring and washer slidably mounted on the cone are substantially easier and faster to install on a roll assembly than attempting to contract a split washer to fit it outwardly in a groove cut on the inside of a cup forming the outer race.

Another advantage of using a felt washer of this sort in place of the common sealing device employing either a close running fit or a tortuous path between the spindle and the rotating member is that the felt wiping material is of such a nature that a static electrical charge collects on the portion of the material making contact with the rotating parts, such charge attracting any lint and fly in or near the path of the wiping material and thereby preventing the ingress of this foreign matter into the bearing chamber.

Other objects of the invention and the manner of their attainment are as set forth herein.

An illustrative embodiment of the invention is shown in the accompanying drawings, in which Fig. 1 is an elevation of a top roll construction embodying our invention.

Fig. 2 is a longitudinal sectional view on line 2—2 of Fig. 1.

Fig. 3 is a face view of the expansible washer used as a retaining ring.

The drawings show the invention applied to a top roll of double-boss construction for use in spinning frames. Herein, as indicated in Figs. 1 and 2, a shaft 1 forms the non-rotating supporting element for duplicate roll shells 2 encircling the shaft and comprising cots 4 formed of rubber compound or other suitable cushioning material each mounted on a sleeve 3 with oppositely facing cups 5 and 7 having their reduced end-portions fitted in opposite ends of the sleeve, each cup supported on a set of ball bearings 8, 10. The portions of the cups outside the sleeve are of the same outside diameter as the sleeve and form continuations of the surface thereof which help support the cot.

Within each roll shell 2 are oppositely tapered bearing cones 9 and 11 slidably supported by the shaft and extending axially inwardly towards each other, the races 12 of which cooperate with races 6 formed in the cups 5 and 7 to receive the sets of balls 8 and 10 including their usual ball retainer 19.

End caps 13 fitting the cap bar slots of the spinning frame and screwed onto the reduced threaded ends 14 of shaft 1 engage the outer cones 9 of each roll shell 2 and hold the bearings in adjusted relation, being locked by screws 16, while a spacer sleeve 15 holds the roll shells in proper spaced relation by its engagement with the inner cones 11, and also receives the saddle of the roll weighting means.

In accordance with the invention each of the four stationary cones 9, 11, on the shaft is formed with a peripheral groove 20 located outwardly beyond the ball race 12 therein, such groove 20 preferably having a shoulder 18 at the outward side of the groove, the outer rim of this shoulder fitting closely within, but not contacting, the proximate surface 22 of the cups 5, 7. In this groove 20 is seated a washer 17 of felt or other suitable material, preferably fibrous, which engages the proximate inner surface 22 of the recess in cups 5, 7, and through its wiping contact with such surface forms a barrier sealing the bearing chamber occupied by balls 8, 10, so as to exclude lint, fly, and other matter therefrom, and also sealing in the lubricant of the ball bearings against escape outwardly from such chamber. The felt washer 17 is secured in place by a retaining ring in the form of an expansible split metallic washer 21, Figs. 2 and 3, lodged in the groove 20 alongside the felt washer 17 and through its resilience holding the latter washer compressed axially against shoulder 18 and thus expanded radially into engagement with the surface 22. Split washer 21 is of such width as to support the felt washer nearly to the inward surface 22 of cups 5, 7, being of approximately the same outside diameter as shoulder 18.

In assembling the parts, first the felt washer 17 and then the split washer 21 are placed over the small end of the cone and then slid home against shoulder 18 thereof by pressure applied solely to the split washer, both washers being expanded by their passage over the successively increasing diameters of the tapered portions of the cone lying at both sides of ball race 12 until both washers settle into the groove 20 with accompanying radial contraction, the split washer locking the felt washer securely in place. The cones are thereafter slipped manually into place on shaft 1 within the roll shells 2, and the end caps applied, adjusted and locked.

The felt washers 17 make snug wiping contact against surface 22 of the inside of cups 5, 7, barring ingress of fibers to the bearings. Also, since the surfaces 30 of the cones 9, 11 outward of the sealing washers 17 taper sharply in directions away from the washers 17, fibers entering the ends of the cups 5, 7 and carried around thereby as the roll shells rotate are diverted away from the washers 17 by reason of the well-known trait of the fibers to seek to enwrap themselves about the smallest available diameter of the stationary parts they engage.

In overhauling, cleaning, and relubricating the rolls no difficulty is presented by the improved lint seals of the invention. When it is desired to replace the felt sealing washers 17, the split washers 21 are merely expanded and sprung out of their grooves 20, which are very shallow, and slid off over the small ends of the cone, whereupon the old felt washers can be replaced by new ones. The ends of the split washers 21 are notched as indicated at 25 to facilitate their being spread to enlarge the passage through such washers, as by the insertion of a screw driver or other tool in the notches 25.

In cases where the cone is not of sufficient diameter to supply the radial wall 18 supporting one side of the felt washer 17, as for instance in existing structures, groove 20 is merely made wide enough in an axial direction and deep enough to admit a supplemental split washer, duplicating the inner washer 21 at the outer side of each felt washer 17, this duplicate split washer performing the same function as wall 18 in supporting the outward surface of the felt washer and maintaining it in true radial relation on its cone.

The rubbing of the felt washer 17 against the interior surface 22 of cups 5, 7 under ordinary atmospheric conditions generates a certain amount of static electricity which supplements the mechanical entangling or wiping action of the component fibers of the material in seizing and holding any lint and fly finding its way inward through the ends of the shell roll 2. This effect is enhanced when animal fibers are used to make the felt washer.

While we have illustrated and described a certain form in which the invention may be embodied, we are aware that many modifications may be made therein by any person skilled in the art, without departing from the scope of the invention as expressed in the claims. Therefore, we do not wish to be limited to the particular form shown, or to the details of construction thereof, but What we do claim is:

1. In a shell type top roll for drawing mechanism, in combination, a shaft, roll shells encircling the shaft and spaced axially apart, cups fitted in the ends of each roll shell, bearing balls within the cups, bearing cones mounted on the shaft within each cup provided with grooves and with shoulders adjacent the grooves, a fibrous washer seated in each groove and engaging the inner surface of its adjacent cup, and a retaining member seated in the groove adjacent each washer resiliently pressing the washer against the shoulder of each cone.

2. In a top roll for textile machinery, an outer race member, an inner race member extending within the outer member and having a shoulder and a groove, rolling elements in rotatable engagement with the members, a fibrous washer seated within the groove of the inner race member and engaging the inner surface of the outer race member, and means resiliently pressing the fibrous washer against the shoulder.

3. An anti-friction top roll having in combination, a shaft, a roll shell rotating about such shaft, an outer race member rotating with the roll shell, an inner race member stationary on the shaft and tapering outwardly from its portion of maximum diameter, bearing balls between the two race members, and a fibrous lint barrier mounted on the inner race member and extending beyond the maximum diameter of the latter into engagement with the outer race member beyond the inward terminus of the tapering portion of the inner race member, and cooperating with such tapering portion to exclude lint from the bearing balls.

4. In a top roll for drawing mechanism, in combination, a shaft, a roll shell, anti-friction bearings between the shaft and the roll shell, comprising outer race members in connection with the roll shell, stationary inner race members on the shaft within the outer race members, and rolling elements between the inner and outer race members, an end cap screwed onto the end of the shaft, a barrier of yielding material disposed concentrically of the shaft and between the end cap and the rolling elements, and held by engagement with a stationary race member from rotation with the roll shell and a removable annular member bearing against said barrier to hold it under axial compression and thereby expanding the barrier into wiping contact with the interior of the roll shell, the said inner race member and barrier being held from outward axial movement by the end cap.

References Cited in the file of this patent

UNITED STATES PATENTS

| | | |
|---|---|---|
| 594,605 | Collins | Nov. 30, 1897 |
| 762,081 | McNulty | June 7, 1904 |
| 1,665,136 | Lauffer | Apr. 3, 1928 |
| 2,009,281 | Stein | July 23, 1935 |
| 2,150,796 | Brouwer et al. | Mar. 14, 1939 |
| 2,221,553 | Okun | Nov. 12, 1940 |
| 2,237,004 | King | Apr. 1, 1941 |
| 2,267,443 | Cobb | Dec. 23, 1941 |
| 2,355,511 | Cobb | Aug. 8, 1944 |
| 2,525,592 | Cotchett | Oct. 10, 1950 |
| 2,644,202 | Cotchett | July 7, 1953 |

FOREIGN PATENTS

| | | |
|---|---|---|
| 274,427 | Great Britain | Oct. 27, 1927 |